(12) United States Patent
Shropshire (10) Patent No.: US 7,107,197 B1
(45) Date of Patent: Sep. 12, 2006

(54) WIRING HARNESS DATA SYSTEMS

(75) Inventor: Arthur Edward Shropshire, Manchester (GB)

(73) Assignee: Mentor Graphics Corporation, Wilsonville, OR (US)

( * ) Notice: Subject to any disclaimer, the term of this patent is extended or adjusted under 35 U.S.C. 154(b) by 731 days.

(21) Appl. No.: 09/771,115

(22) Filed: Jan. 26, 2001

(51) Int. Cl.
G06F 17/50 (2006.01)

(52) U.S. Cl. .............................. 703/13; 703/14; 703/7; 703/25; 703/18; 716/12; 700/97

(58) Field of Classification Search .................. 703/13, 703/14, 7, 25; 716/12; 700/97; 307/147
See application file for complete search history.

(56) References Cited

U.S. PATENT DOCUMENTS

| | | | |
|---|---|---|---|
| 5,038,294 A * | 8/1991 | Arakawa et al. ............... | 716/12 |
| 5,365,659 A * | 11/1994 | Ueda et al. .................... | 29/863 |
| 5,506,950 A * | 4/1996 | Hughes et al. ............... | 345/420 |
| 5,610,447 A * | 3/1997 | Nishikawa et al. ........... | 307/38 |
| 5,610,454 A * | 3/1997 | Nishikawa et al. ......... | 307/147 |
| 5,745,765 A | 4/1998 | Paseman | |
| 5,793,648 A * | 8/1998 | Nagle et al. .................... | 703/8 |
| 5,856,908 A * | 1/1999 | Takiguchi et al. .......... | 361/690 |
| 6,002,854 A | 12/1999 | Lynch et al. | |
| 6,438,435 B1 * | 8/2002 | Wada et al. .................... | 700/97 |
| 6,457,165 B1 * | 9/2002 | Ishikawa et al. ............... | 716/12 |
| 6,625,299 B1 * | 9/2003 | Meisner et al. .............. | 382/103 |
| 6,879,941 B1 * | 4/2005 | Ehrenberg et al. ............. | 703/1 |
| 2002/0111778 A1 * | 8/2002 | Barrow et al. ................. | 703/1 |

FOREIGN PATENT DOCUMENTS

| | | | |
|---|---|---|---|
| EP | 0 576 277 A1 * | 12/1993 | |
| WO | WO 93/01557 | 1/1993 | |
| WO | WO 02/059801 A3 | 8/2002 | |

OTHER PUBLICATIONS

"Wiring Harness Design can a Computer Help?" R. Billsdon, Computing and Control Engineering Journal, IEEE, Aug. 1998.*
Alibozek.Tim. *Smart Software Builds a Better Harness*, Machine Design. May 7. 1998. pp. 89-92.
http://www.harnware.com, "Welcome to HarnWare.com," website, Tyco Electronics, selected pages printed on Nov. 30, 2005.

* cited by examiner

Primary Examiner—Fred Ferris
(74) Attorney, Agent, or Firm—Banner & Witcoff, Ltd.

(57) ABSTRACT

A wiring harness design is analyzed and module data is created automatically and stored for a plurality of harness modules representing wire and component element requirements for those modules, the modules being capable of assembly in selected combinations to create a complete harness. In various embodiments, harness elements are assigned to modules, at least some of the elements are available to a plurality of modules, an element which is available to a plurality of modules that may be used together is assigned to only one of that plurality of modules but is available to all of that plurality of modules, permissible relationships between modules are stored, modules are selected for use in a harness, and a validation check is carried out automatically with reference to the stored permissible relationships between modules, and wire and component element requirements for the harness using the selected modules are calculated automatically having regard to the assignment of elements to modules, so that an element that is required for two modules that are to be used together will be noted as being required physically only once.

24 Claims, 3 Drawing Sheets

WIRING HARNESS DATA SYSTEMS

FIELD OF THE INVENTION

The present invention pertains to the field of electronic design automation. More particularly, this invention relates to wiring harness data systems.

BACKGROUND

Wiring harnesses are used in a wide variety of environments, including small scale equipment such as personal computers, domestic appliances such as washing machines and tumble dryers, automobiles, and aircraft ranging from helicopters to large passenger aircraft and transport planes. A wiring harness includes a number of elements including wires used to conduct data signals or power, which are bound together by for example helically wound tape to produce a compact and easy to manage array. The wires will be accessible at various points in the harness, in accordance with the positions of items in the equipment with which they are to connect. The harness is usually configured in three dimensions, so that it can adapt to the contours of the equipment in which it is to be located, and the positions of items to which wires are to be connected. The harness may include additional features such as heat resistant portions. The harness design will usually include elements in the form of components such as terminal blocks, connectors, clips, grommets and tubes, as wells as labels, tags and sleeves used to distinguish between wires. A harness may also include other items as well as electrical wires, such as washer fluid tubes used in automobiles. The expression "wiring harness" used in this specification is not restricted to electrical data or power wires.

The design of a wiring harness involves two basic aspects, namely the electrical logic which defines the elements required and how they are to be connected, and the three dimensional layout which deals with the shape of the equipment in which the harness is to be used, the actual physical positions of components to which wires in the harness are to be connected, and so forth. Various computer aided design packages can deal with these aspects, either separately or together. There is a known software system which enables input regarding the electrical and three dimensional requirements to be converted into data concerning the material requirements for the wiring harness. Such software is available, for example, from Mentor Graphics Corporation. This software allows users to view harness plans, conduct design validation exercises, and to produce wire and component requirements, cost estimates, purchasing schedules, sales quotes, formboard drawings, wire cutting details, testing routines, and data for automated assembly systems.

In the automobile industry, in particular, it has become normal to offer a range of options to a customer. For example, there may be a choice of gasoline or diesel engines, manual or automatic transmissions, air conditioning options, electrically operated windows and sunroofs, anti-lock brakes and traction control, in-car entertainment options and so forth. In the past, these may have been offered in predetermined configurations, such as a base model and one or two luxury models with different combinations of features. In such circumstances it was feasible to provide a specific harness for each model, if it would be sold in high enough numbers, or to provide a harness capable of handling all of the possible requirements so that, in the lower models, various wires and components would be redundant. However, in recent years the trend has been for automobile manufacturers to provide a large range of options which, with a limited number of exceptions, can be combined together in any way the customer desires. This presents the possibility of having to produce an enormous number of harness designs, each for a particular combination of options, or a complex universal harness which can cope with all possibilities and will have many redundant wires and components. The use of a universal harness will add considerably to weight and expense, and is no longer considered feasible by, for example, those in the automobile and aviation industries.

A system which has been introduced to deal with the problem of managing large numbers of option combinations, is the "composite harness", again available from Mentor Graphics Corporation. The composite harness system involves the use of a master harness design, with derivatives which have various of the available options. In the design process, a composite harness is in some ways similar to a universal, redundant harness, the harness design containing the full wiring for all possible options. However, since there is no intention to build the composite harness as such, the wires and components belonging to the optional features are marked so that they can be included or excluded depending on the harness to be built. Thus, an automobile manufacturer would define an ideal set of packages to offer and a number of derivative or variant harnesses would be specified representing the choices available to the consumer. In practice, the number of derivatives for any composite harness design has been finite, and usually no greater than thirty. The harness manufacturer would fully decompose the design into individual harness variants which would be engineered, costed and built.

The composite harness still assumes a certain restriction of choice for the consumer. Customers increasingly expect to be able to tailor even mass produced automobiles to their own specification. Whilst in theory the composite harness technique could have dealt with the increasing demands, by specifying a new derivative as and when needed to cope with a virtually limitless number of option combinations, in practice the overall composite process is not responsive enough in terms of providing costing, testing and manufacturing system information in the required time scales.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Various embodiments of the present invention can be used for creating and storing data relating to wiring harnesses which can be used, for example, in designing harnesses, calculating wire and component requirements, representing harnesses graphically, costing harness designs, testing harnesses and manufacturing harnesses. The present invention overcomes various design and manufacturing problems in the prior art by designing and using a modular harness system. The modular harness system involves a basic harness to which can be added harness modules corresponding to various options available to customers.

Embodiments of the inventive design system create data relating to a modular wiring harness. Module data is created and stored for a plurality of harness modules representing wire and component element requirements for a plurality of options. The modules are capable of assembly in selected combinations to create a complete harness. Each harness element is assigned to at least one module. At least some of the elements are available to a plurality of modules. And, an element which is available to a plurality of modules that may be used together is assigned to only one of that plurality of modules but is available to all of that plurality of modules.

In alternate embodiments of the inventive design system, a wiring harness design is analyzed and module data is created automatically and stored for a plurality of harness modules representing wire and component element requirements for those modules. In which case, the modules are capable of assembly in selected combinations to create a complete harness wherein harness elements are assigned to modules, at least some of the elements are available to a plurality of modules, an element which is available to a plurality of modules that may be used together is assigned to only one of that plurality of modules but is available to all of that plurality of modules, permissible relationships between modules are stored, modules are selected for use in a harness, and a validation check is carried out automatically with reference to the stored permissible relationships between modules, and wire and component element requirements for the harness using the selected modules are calculated automatically having regard to the assignment of elements to modules, so that an element that is required for two modules that are to be used together will be noted as being required physically only once.

The data created by various embodiments of the present invention can be used for a variety of purposes. For instance, the data can be used in 2D design drawings, costing reports, sales quotes, purchasing reports, formboard drawing production, wire cutting requirements, manufacturing resources planning, engineering resources planning, testing routines, automatic assembly routines, and the like.

Thus, in a simple system there may be a core harness for an automobile and a set of option modules consisting of two electrically operable door mounted mirror modules. One mirror module involves a wire which terminates in a multi-purpose connector, which is used in this module to connect power from the wire to an electric servo motor for positioning the mirror. The other mirror module involves an additional power wire which is connected to different terminals of the multi-purpose connector so that it can be connected to a heater for de-icing the mirror. The data created for each module would include the appropriate wire, the connector, and terminals in the connector and on the wires. The wires and the terminals will be exclusive to each module. However, the multi-purpose connector is common to both modules. In accordance with the invention, data is stored which assigns the connector to only one of the modules, whilst the connector is made available to both. When the design of a complete harness is being created, and one of the modules is selected, all of the elements including the connector are noted as being required. This will be taken into account when calculating parts and labor costs for manufacturing the harness, for example. However, when both modules are selected the fact that the connector is only assigned to one module means that it will only feature once for the purposes of calculating parts requirements and labor costs.

In practice, the design of a harness is split into modules that roughly map to the options available to the customer. There is a virtual parent harness which includes all possible modules. For any such parent harness design, typically there are one or more core modules, such that a customer specific, physical harness must include one but only one core module. All other optional modules may or may not be compatible with each other and with core modules for inclusion in a physical harness design. The compatibility data is stored and checked whenever a customer specific harness is ordered.

It is necessary to divide all of the components and wires of the harness into the modules that have been specified. Once the wires have been assigned to modules it is possible to allocate most of the remaining components automatically. However, there are typically some ambiguous cases that an engineer must resolve. It is then possible to cost, engineer and build each module independently. There is no need to perform a ground-up cost of a customer specific harness, as is the case for the composite harness systems. Instead the costs of the individual modules selected by the customer, are simply added together.

The modules are manufactured as independent parts and the highly utilized ones may be stocked. A customer specific harness is made by assembling the required modules at the final assembly stage. An electrical test pattern, to program the harness electrical test equipment, for the customer specific harness is produced by compiling the programs for the individual modules that have been chosen.

The amount of material needed to bind modules together at the final assembly stage is a function of the modules chosen and therefore can usually only be approximated at the engineering stage. At the manufacturing stage there may not be not enough time to perform a perfect calculation and to add the data to a manufacturing resources planning (MRP) system, so an approximation may suffice.

Since the number of different modular harness variants is almost infinite, this poses particular pressures on data management for the wire harness designer and maker. One embodiment of a database system for use in accordance with the invention is able to store the full harness definition for a parent harness. It is also able to store a list of the module names associated with the parent harness, and a compatibility table that defines how the modules may and may not be specified together. The definition of the parent harness, the module names list and a compatibility table can be keyed into the database system or imported from other systems.

One embodiment of the system in accordance with the invention has facilities for automatically assigning the elements to modules. Manual functions are available for either over-riding the system choices or resolving ambiguous cases. Once the module assignment is complete, a function is used to automatically distribute the parent harness data into individual modules. Each module is stored in the database as a harness in its own right. It is therefore possible to engineer and cost the modules, produce module form board drawings, and apply interfaces (e.g. electrical test or MRP applications) directly to the modules.

A module may also be a composite harness. For example, a sidelight module may have derivatives for a North American market and derivatives for the rest of the world. Therefore it is possible to apply known composite harness capability both to parent harnesses and modules.

Figure 1:
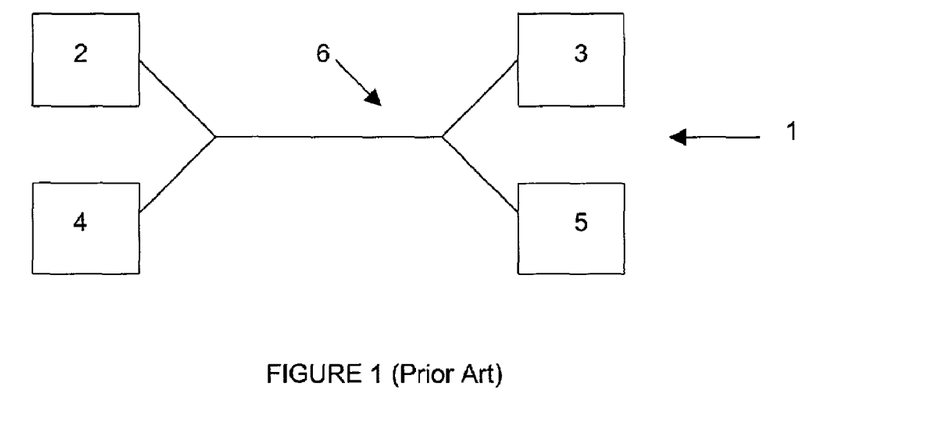
FIG. 1 shows diagrammatically a prior art design for a redundant automobile wiring harness.
Figure 2:
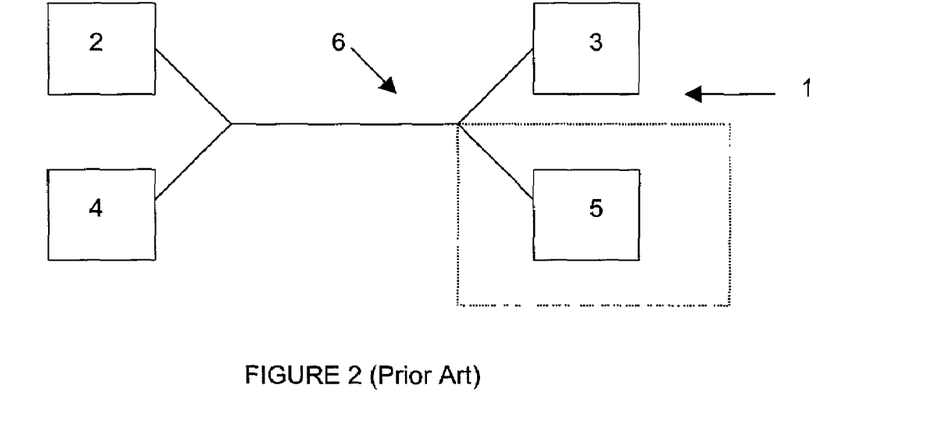
FIG. 2 shows a prior art composite harness design.

Referring now to the Figures, FIG. 1 shows diagrammatically a prior art design for a redundant automobile wiring harness 1 including four features such as door controls 2, mirror controls 3, a radio 4, and an optional compact disk audio unit 5 to be fitted to the automobile, interconnected by wiring generally indicated at 6. The wiring and components for the compact disk unit 5 will be redundant if that option is not selected by the customer, leading to unnecessary material and labor costs in producing the harness. FIG. 2 shows a prior art composite harness design, in which the connector compact disk unit 5 is optional and so is the associated wiring and components such as connectors. If, for example a high trim variant of an automobile is ordered, then the harness for that variant will include the appropriate wiring and connectors for the compact disk unit 5. Otherwise, these elements are omitted. These design models are used to define the materials necessary to construct a harness, to calculate costs and so forth as is known in the art.

Figure 3A:
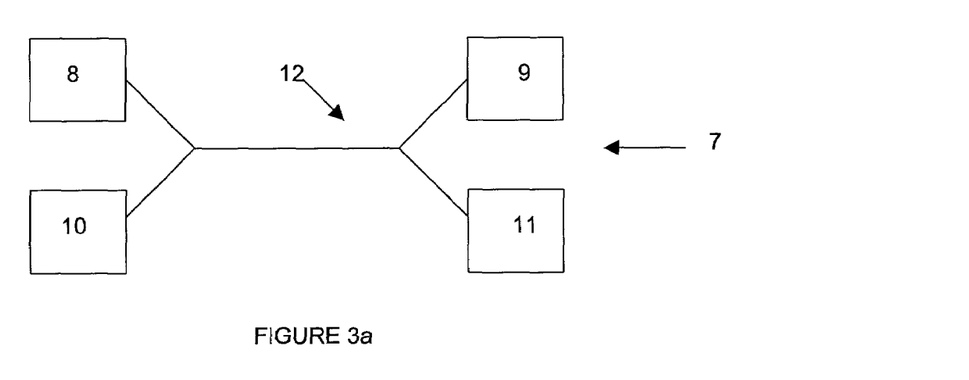
FIG. 3a shows one embodiment of a parent harness design in accordance with the present invention.
Figure 3B:
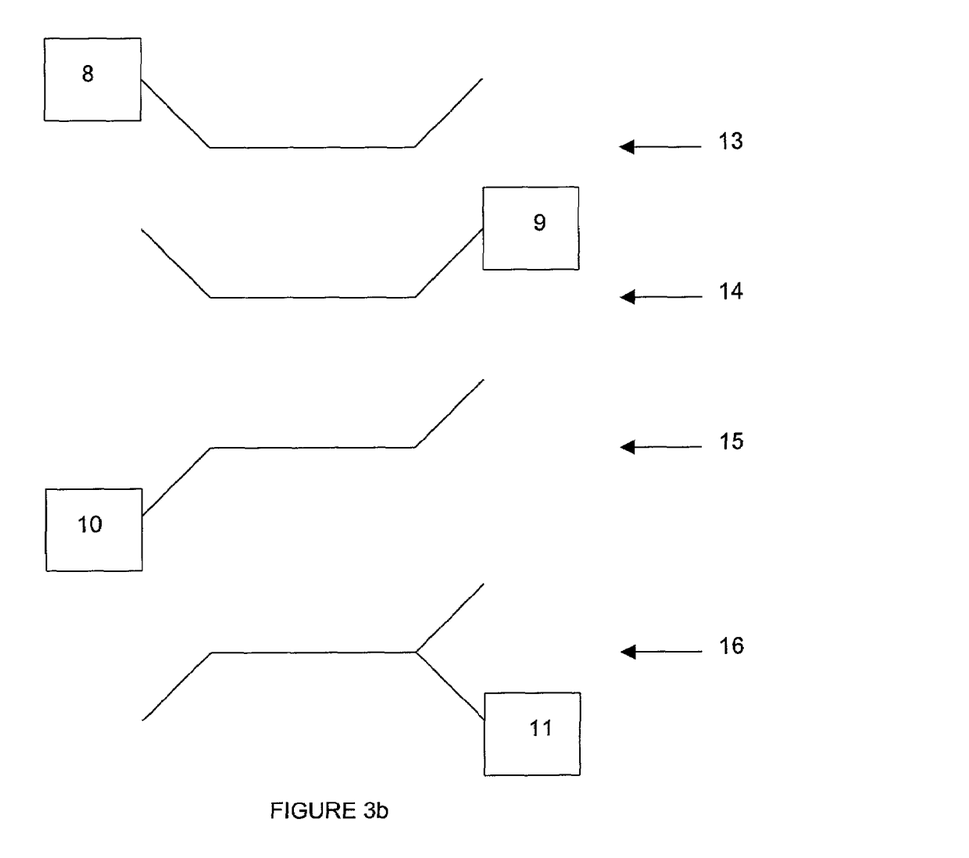
FIG. 3b shows one embodiment of how the design of the parent harness is broken down into modules in accordance with the present invention.

FIG. 3a shows a parent harness design 7 in accordance with the present invention. This includes units 8, 9, 10 and 11, with wiring indicated generally at 12, in a manner which appears similar to the redundant harness 1 of the prior art as shown in FIG. 1. Unit 8 is a door control unit, unit 9 is a mirror control unit, unit 10 is a basic radio unit and unit 11 is an advanced radio unit. However, FIG. 3b shows how, within the system in accordance with the invention, the design of the parent harness is broken down into four modules. Module 13 includes the elements for the door control unit 8. Module 14 is a mirror module including elements for mirror control unit 9. Module 15 is a basic radio module elements for the basic radio unit 10 (Radio 1). Module 16 is an advanced radio unit module, which is an option that can be specified by a customer, with elements for the advanced radio unit 11 (Radio 2). Thus, these electrical features of an automobile are defined as a series of discrete modules which can be built as sub assemblies and combined to form a harness which can be uniquely specific to a vehicle.

In this example, the door module 13 may be compulsory when any modules are selected. The mirror module 14 can be used with any combination of other modules. The radio modules 15 and 16 cannot be used together. It is therefore possible to construct a compatibility and dependence table for this simple exemplary arrangement, as in Table 1.

TABLE 1

| MODULE | Door | Mirror | Radio 1 | Radio 2 |
|---|---|---|---|---|
| Door | I | | | |
| Mirror | C | I | | |
| Radio 1 | C | | I | I |
| Radio 2 | C | | I | I |

In Table 1, "I" indicates an incompatibility and "C" indicates a compatible association which is compulsory. Thus whatever module is selected, there must also be the door module. No module can be selected twice and so each module is incompatible with itself. Radio 1 cannot be selected together with Radio 2 and so there is mutual incompatibility. As an alternative to defining individually the compulsory nature of the door module, it could be specified as a core module so that the compulsory requirement can be registered automatically. There can be more than one core module in a parent harness, but not in a physical harness.

Although in this example the two radio modules cannot be specified together for a vehicle harness, they may use common wires. Thus, assuming that the wiring indicated generally at 12 consists of a number of wires a, b, c, d, e, f, g, h and i, some may be common to both radio modules. Thus, a wire association table may be as shown in Table 2.

TABLE 2

| WIRE | Door | Mirror | Radio 1 | Radio 2 |
|---|---|---|---|---|
| a | X | | | |
| b | X | | | |
| c | X | | | |
| d | | X | | |
| e | | X | | |
| f | | | X | X |
| g | | | X | X |
| h | | | X | X |
| i | | | | X |

Whilst a wire may be associated with more than one module, within the system it is assigned to only one module. If any module requiring the wire is selected, then the wire will feature in calculations for materials, wire cutting requirements and so forth. However, if two or more such modules are selected the wire only features once in the calculations. The same applies to other components. Thus, a connector block may be required for various modules but will be assigned only to one. On the other hand, terminal requirements within the connector block may be unique to specific modules.

In a system in accordance with the invention, basic information may come from various sources. There may be a three dimensional design and an electrical logic design which are combined to form a two-dimensional harness design. The system may produce various reports, such as costing reports, purchasing reports, sales quotes and so forth. A form board drawing may be produced, and information created concerning wire cutting, MRP, ERP (Engineering Resources Planning), testing equipment and automated assembly. In various embodiments, there is the ability to define modular dependencies, to assign wires to relevant modules, to check wire associations against modular dependencies, to assign components to unique modules, to breakdown a parent harness to individual modules, to engineer and cost on a module basis, and where necessary to manually assign items such as tapes and tubes to appropriate modules.

Some of the functions described below are developed from functions in the "CAPITAL H"™ system available from Mentor Graphics Corporation.

Options may be assigned to parts within a Modular Parent Harness as required. However in addition to these options, modules or module codes will also be assigned to each wire and component. A single module may appear similar to a standard harness. However, a single module will have modules or module codes assigned to each wire and component. In addition, it may also be possible that the single module has been defined with composite functions. Therefore it will be possible to run the composite breakdown process against a single module.

A new process, the Module Assignation process, automatically assigns modules to components within either the Modular Parent Harness or the single module, depending on the modules that were pre-assigned to the wires within the item. This function is described in detail below. A new process, the Modular Breakdown process, works with regard to modules against wires. If a wire is assigned to a certain module then it will appear in that module and therefore all components at each end of that wire will also be broken down to that module. However, it is possible that the components at the end of that wire are not assigned to that module. Although they can be seen at the relevant locations on that module, they will not appear on the Bill of Materials ("BoM") of the module or be included within the labor calculations.

It is possible that the Modular Parent Harness will also contain Options against parts. Therefore it will be possible to perform a Breakdown process on the Modular Parent Harness or if required, on the Modules once the Modular Breakdown has been run.

Thus there are a number of different processes that a user may follow in order to create the BoM for a single module. The pre-requisite for using this functionality is that each wire is pre-assigned to a module. This may be done either manually or via an automatic import process from an external design system.

A user will be required to enter the Modular Parent Harness base details information before entering the specific Modular Parent Harness data. The user will define a harness module against which all of the relevant module data will be recorded. The form for registering an individual module will include a field in the database which will identify that the item is a Module. The user will define an Internal Module Number in an appropriate field and an internal issue number will also be associated to the module harness in an appropriate field. A customer module number will also be entered along with a customer module issue number.

The user will assign each individual module to its corresponding Modular Parent Harness. The user will need to complete this association before any data is entered against the specific Modular Parent Harness. In a practical example, a maximum of 200 modules can be defined to one Modular Parent Harness. An expandable tree structure will list the modules that belong to each Modular Parent Harness. The user will have the ability to filter a list of all harnesses so that only the modules are displayed. The user will be required to enter the modular harness and associated module base details information before entering the specific modular data into the system. If a module number has been entered this number will be used throughout the system in place of the harness number. Where the user has entered an internal module number and issue along with a customer module number and issue, the system will not require that the user enters the internal harness number, customer number and relevant issue numbers. If module data is entered into the system, the relevant internal and customer module numbers will always appear in the place of standard harness numbers for reporting purposes. In addition to the module number, a module code associated with a module will also appear in the reports. It may be necessary that the user has defined the correct Module Number and Module issue level for all modules and the module code associated with each module within the Modular Parent harness.

The user will define a compatibility list. This list will define which of the module numbers must appear together (compatible) and which modules cannot appear together (incompatible). If no relationship is defined between two modules then it is assumed that the modules may appear together. A table will be created that will define the relationships between each module in a harness, as exemplified in Table 1 above. The table is a list of module against module. For each intersection of one module with another, there is the possibility of the following three items:

| 1. C | Compatible |
| 2. I or M | Incompatible |
| 3. W (or blank) | No Entry (no relationship between modules) |

The table will be recorded in the database against the Modular Parent Harness. If a Modular Parent Harness is up-issued and data copied to the new issue, the compatibility table will also be copied if available. The table can be created manually or can be imported automatically from e.g. a comma-delimited file. The user will define the delimiter used within this file before the import process is run.

The module code is user-defined text that indicates that a part belongs to a module. Therefore if a wire belongs to module X, it will have the code for module X as a module code. The user must ensure that each module code appears against the relevant module in the modular harness base details. This code is not mandatory. If no module code exists it will default to be the internal module number of that module.

Certain relationships between modules will be checked for their validity. The validation will be carried out on the entries in the compatibility table. The checking process will determine errors, inconsistencies and ambiguities in the specified compatibility matrix. On choosing the "Accept" button, each matrix cell will be compared against its "mirror". For example, a cell A3, would be compared against cell 3A, and the following checks will be performed.

| Cell Value | Mirror Value | Results in |
|---|---|---|
| Incompatible | Incompatible | No Action (is valid) |
| Incompatible | Mandatory | Error Message |
| Incompatible | Blank | Default of Mirror value to Cell value |
| Mandatory | Mandatory | Warning Message |
| Mandatory | Blank | No Action (is valid) |

Where messages are displayed, the option to cancel the update will be given. If the end-user chooses to cancel the update, then the compatibility table will not be written back to the database, but the window will remain open.

Each matrix may have dependencies based upon the specified hierarchical relationship to other modules. For example, A is mandatory with B, and B is mandatory with C, then A must also be mandatory with C should be shown as such.

On "Accept" The system will evaluate dependencies, and query the end-user with "Yes/No" options to auto-fill each invalid dependency encountered. The option "Yes to All" will also be provided, and if selected, no further dependency prompts will be displayed.

When the database is updated, an audit trail record will be written to indicate the update, and the success or failure of the checking process. The end-user may choose to ignore any error or warning from the checking process and update the compatibility table to the database.

If a module has been deleted from a Modular Parent Harness, the assignation for this module should be removed from all parts in the Modular Parent Harness. Any part without assigned module codes may then need to be removed from the Modular Parent Harness.

If the Modular Parent Harness is being updated, the function will be available that will review the current assignations within the parent design. The system will review all module codes currently against a part. If any of the module codes occurring at this part are not associated to a module in the parent design, then the module to which they did belong must have been deleted from the Modular Parent Harness. Therefore the module code must also be removed from all parts. This process may create parts that have no assignation in the Modular Parent Harness. The system will create a list of all of the items against which there are no modules assigned. This list will be recorded in the database against the relevant Modular Parent Harness. The user will be able to review this data in a form. The data will take the form of Component Part Number and Location. In the case of insulation, the location will be the start and end node and layer. The user will be able to review this data and remove any items from it that are to remain on the Modular Parent Harness. All items that the user keeps in this list will be deleted automatically from the Modular Parent Harness via a delete procedure.

The user will be required to start this review process. The user will review the list of parts with no assignations on the screen and manually remove any items that are to remain on the Modular Parent Harness. The user will confirm that the items listed should be deleted from the Modular Parent Harness.

The system will assign all node components and insulation to a specific module or modules. If a module has been assigned manually to a component at a node, the process will not update this item. For each component at a node the system will automatically assign a module code. However, the user will be able to manually define to which module or modules the component belongs. Automatic assignations are carried out based on the 'Module Compatibility List'. If no Module Compatibility List exists for the Modular Parent Harness being processed, then no modules can be assigned automatically to components. All assignations will have to be made manually by the user. In addition, no validation checks will be run against the manual assignations. For each branch insulation the system will automatically assign a module code. However, the user will be able to define to which module or modules the insulation belongs. For each wire and multicore wire the user will have to manually define to which module or modules the wire belongs. For components and branch insulation, the user will be able to request that the system automatically selects the required modules. The selection will have three possible options:
1. Do not select modules where the modules have been assigned manually.
2. Select modules for all items irrespective of whether existing modules have been associated manually.
3. Assign modules only to items that currently do not have any assignation.

When copying data to a new Modular Parent Harness issue, the system will also copy the modules to which each item is associated. Where an item on a harness module is not directly associated to that module, the item will not appear in the engineering information produced for that module.

The user will be required to start the modular selection process. Before the process is run, the user will confirm whether all items are to be reselected or just those not entered manually.

When copying data from one module or Modular Parent Harness to another, the system will also copy any module data associated with that module. The user will register from which module or Modular Parent Harness data is to be copied when registering a new module or Modular Parent Harness. The user will have the module or Modular Parent Harness to copy to as a current open item.

Child modules of the parent will be up issued using the same functionality as is currently available for up issuing derivatives of a composite harnesses. Running the copy process will identify that the items being copied are modular and will therefore copy all module information available against the 'Copy From' item to the 'Copy To' item. If a module compatibility list is defined against the 'Copy From' item, this list will be copied to the 'Copied To' item.

The user will be required to assign the 'Copy From' item and version when registering the new module or Modular Parent Harness. The user will be required to run a Copy Harness Data process in order to copy all data to the new module or Modular Parent Harness.

The system will follow defined rules to assign modules to Connectors and Extra Node Components where the main component is a connector. A connector in this instance can be defined as the main component at a node at which wires terminate that is not a Splice, Solder Sleeve or Ultrasonic Weld. The system will review all of the wires at the component and the modules associated to these wires. The component will be assigned to a module or modules based on the following rules, set out in Table 3:

TABLE 3

| CASE | Component Assignation |
| --- | --- |
| All wires are associated to core modules | Assign the component to all of these core modules |
| Wires are associated to core modules and non-core modules | Assign the component to all of the core modules and no others |
| All wires are associated to the same module | Assign the component to that module |
| All wires are associated to modules that are incompatible with each other | Assign the component to all of the modules |
| All wires are associated to modules that are compatible with each other | Assign the component to the Mandatory module. |
| All wires have no relationship to each other | The system will request that the assignation be made manually. |
| Non of the above cases | The system will request that the assignation be made manually. |

The system will run through the assignation process in the following order:
1. Are there any core modules on the relevant wires?
   If yes, then assign the core modules to the item under review and end the process for this item.

If no, then continue.

2. Are all of the modules on these wires incompatible with each other?

If yes, then assign all of the modules to the item under review and end the process for this item.

If not all of the modules are incompatible, then continue.

3. Are there any modules that are incompatible to all other modules?

If yes, then record the modules and remove them from the process in step 4.

Go on to step 4.

If no, then continue.

4. Is there a relationship between all the modules remaining after step 3

If yes, then assign the mandatory module. Also assign any modules recorded from step 3. Finish the process for this item.

If no, then return a warning and finish the process for this item.

If a module code is identified to be assigned to a component, and this module is already assigned to the component, the code will not be assigned again. By default, the system will give all extra components at the node the same assignation as the main component. It is possible to manually change the assignation of the extra components at a node if they are to be different from the assignation of the main node component. The user will be required to select an option to run the modular selection process. Before the process is run, the user will confirm whether all items are to be reselected or just those not entered manually.

Multiple location components are components defined within the system as appearing at more than one location. The user will be able to manually define the modules to which a multiple location component is associated. No automatic assignation will be attempted for multiple location components. The system will report all multiple location components that require manual module assignment. The user will locate relevant multiple locations and manually assign a module to the component across those components.

The system will follow defined rules to assign modules to splices, ultrasonic welds and solder sleeves. Splices, ultrasonic welds and solder sleeves will be referred to in this description under the general term Splices.

If a module code is identified to be assigned to a component, and this module is already assigned to the component, the code will not be assigned again.

Center strips will have the same module assignment as the wire containing the center strip. This assignation will be manually modifiable if required.

The user will be required to select an option to run the modular selection process. Before the process is run, the user will confirm whether all items are to be reselected or just those not entered manually.

The system will follow defined rules to assign modules to cavity components and extra cavity components. The process will associate cavity components such as terminals and cavity seals to the module(s) to which the wire belongs. If the Modular Parent Harness contains a multiple termination at a cavity, the system will review whether an actual multiple termination is possible in a real harness. To do this the system will refer to the compatibility list.

Where two or more wires at a cavity component are associated to modules that are compatible then the component will be associated to the mandatory module. The mandatory module is defined as the module to which all other modules at this location are compatible. For selection of the terminal, the system will register the termination as the containing wires belonging to the mandatory module plus any other wires that may also be included in a harness containing the mandatory module. Therefore a multiple terminal will be selected. All such terminations will be recorded in the database along with the Internal Wire Numbers at that location. The user will be able to review this list through a standard form.

1. Where the modules of the wires are incompatible, the component will be associated to all modules of these wires.

2. If there is no relationship between the modules of the wires, the component will be associated to all of the modules. This means that if the termination is multiple, then the BoM for a complete harness containing these modules will have too many of this component. This is the worst case scenario and is required so that enough components will be in stock. In addition to this the labor costing must also take the worst case scenario, which is a multiple (manual), rather than single (automatic), termination.

If a module code is identified to be assigned to a component, and this module is already assigned to the component, the code will not be assigned again. Wire end components will be given the same module assignation as the wire on which they are located. This assignation will be manually modifiable if required. Extra cavity components will be associated to the same modules as the main component at that cavity. It will be possible to manually change the assignation of the extra cavity components if they are to be different from the assignation of the main cavity component. Cavity components at cavities that do not contain a wire will be associated to the same modules as the main component at the node. The user will be required to select an option to run the Module Assignation process. Before the process is run, the user will confirm whether all items are to be reselected or just those not entered manually.

The system will follow defined rules to assign modules to branch insulation. The assignation process will refer to each branch containing insulation not to the individual insulation record. The system will split each insulation record into individual branches using a specific join code to identify where insulation is a single piece or a series of applications. This will not apply in the case where the insulation is a tube. A tube will not be split into multiple pieces to span multiple modules. If a single tube is identified as belonging to different modules, the user will be warned. In this case the user will have to define separate tubes as required. Thus, if an insulation record spans more than one branch, the system will identify each branch individually, create a join code for that branch and then assign modules to each insulation on that branch. In the case of tubes, the system will assign modules to the tube across multiple branches where necessary. Rather than referring to wires terminating at a location, the system must review the wires running through the location. If a module code is identified to be assigned to a component, and this module is already assigned to the component, the code will not be assigned again. The user will always be able to define a module or modules against the insulation on a branch manually where required. The user will be required to select an option to run the modular selection process. Before the assignation process is run, the user will confirm whether all items are to be reselected or just those not entered manually. The system will follow defined rules to assign modules to main node components and extra node components that do not have terminating wires. The process will associate main node components and extra node components where no wires terminate, such as Grommets and Clips, to modules based on the rules. However, rather than referring to wires terminating at a location, the system must review the wires running through the location. Components that cannot be assigned to modules will be recorded in the database. The user will be able to review these parts via a standard form. By default, the system will give all extra components at the node the same assignation as the main component. By default, the system will give all cavity components at the node the same assignation as the main component. The user will be required to select an option to run the modular assignation process. Before the process is run, the user will confirm whether all items are to be reselected or just those not entered manually. The user will review the unassigned items and manually assign the required module to each of the items listed.

The system will record all part numbers and locations of items that it could not assign during the automatic assignation process. In the case where the system has not been able to assign a module or modules to an item automatically, the part will be recorded in the database along with its location against the relevant harness. In the case of branch insulation both the start and end node and the layer of the insulated branch will be reported. In addition to this, the modules of all of the wires at or through this location will be reported. The user will assign modules to these items manually. A form will allow the user to remove all assignations made manually against items in a modular harness. The user will be required to select an option to run the modular selection process.

The system will allow the user to define the quantity of a component at a location that will be associated to a particular module. The system will allow the possibility for the user to assign a percentage BoM quantity to any components that the user may require. The system will list a component at a location requested by the user. In the case of branch insulation the item will be identified by the start and end location and layer. The system will list all of the modules that have been associated to this component. The user will then be able to define a percentage quantity of the component that is to appear on the BoM for each individual module listed. When the user confirms that all BoM quantity modifications have been made, the system will check that the sum of the percentages for each component $\leq 100\%$.

An example of the need for this function is as follows. A component at a node has two wires terminating at it. These two wires belong to two modules that have no relation to each other. Therefore it is possible for the user to assign the component to both modules but set a BoM quantity of 50% to each.

The user will identify the component by its part number and its location (node and cavity) on the harness. The user will define the quantity of this component at this location that is to appear on each module to which the item is associated.

The system will calculate the bill of materials of an individual module based on whether each component on that module is also assigned to that module. When calculating the BoM for a module, certain information will be taken from the Modular Parent Harness. Therefore the BoM must have been calculated for the parent and must be up to date before the module BoM can be calculated. The process to calculate the bill of materials will identify whether the item being processed is a module. If identified as a module, for each part on the harness, the system will ensure that that part is assigned to the module being processed. If assigned to the module being processed, then the part will be included in the BoM for that module. If not assigned to that module, the part will not be included in the BoM for that module. If a part is assigned to the module under question, the system will check as to whether a manual BoM percentage has been entered against that part. If no manual BoM has been registered then the system will calculate the quantity of the part on the module using the current method. If a manual BoM percentage has been entered against the part the system will calculate that percentage of the part as being on the BoM of the module under question. If identified as a module, the system will calculate the maximum possible branch size in addition to the real module branch size. The maximum possible branch size is calculated by reviewing all items through that branch and assessing whether the modules to which they are associated can appear with the module under question. The maximum possible sizes will be shown in 'Bundle Analysis' screens.

If a branch insulation on a module has been set as 'Selected Tube' the system will calculate the bundle size based on the maximum possible size as described above. A tube will be selected by the system based on this maximum size. A warning will be written to the Engineering Calculations log file that this maximum size has been used for the tube selection. If tape on a module is to be calculated using the existing calculation method, the branch diameter to be used will be the maximum possible branch size.

Where a component has been given a percentage quantity, the system will show the total quantity of that component on the module in the BoM. E.g. if a component appears on a module twice both times with a BoM quantity of 50%, the BoM will show a total quantity of one unit for that component on the module. The user will need to run an Engineering Calculations function against a module (or group of modules) in order for the system to calculate the BoM.

A report is usually required for the Modular Parent Harness entered into the system. All electrical connection information is usually required. The report will only include nodes at which wires terminate. If the main component at the node is a Splice, Ultrasonic Weld or Solder Sleeve, the Main Component part number below will be replaced with the Splice part number. If no part number exists, the word Splice, UWeld or SSleeve will be written in its place.

The report may include:
Component Node name
Main Component part number
Main Component description
Module number(s) to which Connector belongs (Include percentage BoM quantity for each module where applicable)
Cavity names
Wire numbers at each cavity
Module number to which wire belongs
Components at the end of each wire
Other end of wire Node and Cavity name.

If the component at the end of a wire is an in-house assembly component, then the sub component part numbers will be given not the assembly part number. The report may be 1. Saved to a file in a fixed format
2. Saved to a file in CSV format
3. Printed without having to save to a file.

The module(s) to which a wire belongs will be defined against each wire. The user will be able to define the module to which the wire belongs. This can be done either during entry of a wire into the system or through a table as exemplified in Table 2 above. If the module of a wire is to be set during the entry of the wire, and the wire belongs to more than one module, then the modules will be separated by the Boolean character /. The user will be required to define the module to which a wire belongs either via the table format defined above or by entering the module number or associated code against the Internal Wire Number during entry.

The system will review the modules associated to the wires for validity. When running the module assignation process, before assigning modules to any components, the system will review the modules associated to a wire and compare them with the module compatibility table. The validity check will be made based on the following rules.

If the wire is associated to a core module it can only be associated to other core modules. If it is associated to a core module and a non-core module the system will report an error.

If the wire is not included in a core module it may be:
a. Only assigned to a single module
b. Assigned to multiple modules that are all defined as incompatible with each other.

If a wire is assigned to multiple modules that are either compatible or have no relationship to each other then the system will report an error. All errors found during this process will be written into a standard text file. The user will select the module assignation process to be started. At this point, the user will define the name of the log file into which the process events will be written.

If the same wire is used in two different modules but has different start or end location the wire will need to be re-named for the two modules. In the case where the same wire number is used for two wires with different start and/or end locations, the user must be able to re-name the wires. The re-named wire will become the Internal Wire Number, the original wire will be recorded in the Customer Wire Number. Therefore it is possible to have two Customer Wire Numbers the same for two different Internal Wire Numbers.

If the same wire is used in two different modules but has different attributes between the modules, the wire will need to be re-named for the two modules. The attributes to be taken into consideration when defining whether a wire is to be re-named are:
  Length
  Color
  Cross Sectional Area
  Material
  Wire Specification
  Components at the end of the wire The re-named wire will become the Internal Wire Number, the original wire will be recorded in the Customer Wire Number. Therefore it is possible to have two Customer Wire Numbers the same for two different Internal Wire Numbers.

The system will allow a connector to be assigned manually to an individual module. The system will allow the user to manually specify to which module a connector belongs. This connector will only appear on the Bill of Materials for the specified module.

The system will allow more than one module to be defined against a connector at a specific location. The system can automatically assign a module to a connector. If a module has been manually assigned to a connector, the system will not overwrite this assignation unless requested to do so by the user. The user will be required to enter the module or modules to which a connector at a location should be assigned on the Modular Parent Harness. If processing a modular harness to assign modules automatically, the user will be required to confirm whether manually assigned modules will be protected or updated.

The system will allow a splice, ultrasonic weld and solder sleeve to be assigned manually to an individual module. This description will refer to splices, ultrasonic welds and solder sleeves under the general term of Splices. The system will allow the user to manually specify to which module a splice belongs. This splice will only appear on the Bill of Materials for the specified module. The system will allow more than one module to be defined against a splice at a specific location. If a module has been manually assigned to a splice, the system will not overwrite this assignation unless requested to do so by the user. The user will be required to enter the module or modules to which a splice at a location should be assigned on the composite harness. If processing a modular harness to assign modules automatically, the user will be required to confirm whether manually assigned modules will be protected or updated.

The system will follow defined rules to assign modules to splice headers. Splice headers are components currently used by certain automotive manufacturers. A splice header is a component into which wires are inserted that then creates an electrical connection between these wires. Splice headers are to be treated under exactly the same procedure as connectors. Splice headers will be defined in the database under the Group 'Connector'. Therefore there is no requirement to identify splice headers as a specific item for the purposes of this function.

The system will check that all connectors appear on the BoM of at least one module. If any connectors are identified as not having been assigned to at least one module, the internal part number of the connector along with the node name at which it appears will be reported to the user. The same process will identify where a part on the modular harness has specific BoM percentage quantities assigned to it. The system will check that the total percentage for the part equals 100%. If the total does not equal 100% the system will report this part and its location along with the total percentage BoM quantity. This report will be shown on screen. The user will be able to save this report to a text file if required.

A module breakdown process creates individual modules from a modular harness based on the modules assigned to the wires. A process is run against a modular harness. The process will review the modules to which each wire is assigned. The process functions in the same way as a composite breakdown process does today, however instead of the option used by the composite breakdown, the module breakdown will use the module or module code. Each wire assigned to a module will be broken down to appear in that module. Modules against any parts that are not wires will be ignored. Therefore as an example:
  Connector A is placed at node C1
  Connector A is assigned to module N
  Connector A contains wire X and wire Y
  Wire X is assigned to module N
  Wire Y is assigned to module M After the module breakdown process, module M will have Connector A at node C1 and will contain Wire Y.

The length of tape used on a branch is manually adjustable. The system will allow the choice of three possible methods for tape length calculation:
  Standard tape length calculation.
  Manually entered for the branch.
  The taped branch length multiplied by a user defined factor.

If the tape length for a branch is entered manually, the system will not overwrite the this manual length with the automatically calculated tape length. Where required, the multiplication factor will be set for each individual taped branch. If a multiplication factor is available for a taped branch, the length of the tape will be calculated by the factor multiplied by the branch length. The automatically calculated length of tape will not overwrite this tape length. If the length of the tape is to be calculated using the standard calculation method, the system will take the branch size from the Modular harness as the actual branch size. If the user requires that the branch tape length is not calculated by the standard method, it will be necessary for the user to define either the length or the multiplication factor for the tape on the relevant branch.

The user is able to enter modules against components in a graphical design system. Where parts can be assigned to modules within a form based engineering database system, so the same parts will be definable to specific modules within the graphical design system. When importing the harness from the design system into the engineering system, the module and assignations will be imported. The engineering calculation process will be run against each individual module. The process takes into account the module to which each part is assigned. If a part is not assigned to the module under process, that part will not appear in the bill of materials of that module.

If a manual tape length has been entered for the module under process, that tape length will be written to the bill of materials for the module and not the calculated length. If a multiplication factor has been set against a branch for the tape length, the tape length in the bill of materials will be the length of the branch multiplied by the multiplication factor.

In the case where a selected tube has been entered for a module, the tube will be selected based on the branch size through that tube on the Modular Parent Harness to which this module belongs. This branch size will be calculated based on the wires through that branch plus any insulation thickness on the branch as defined on the Modular Parent Harness. In the case where a tape length is to be calculated using a standard method of calculation, the system will take the branch size for the branch along which the tape runs from the Modular Parent Harness.

Design changes that are made to a Modular Parent Harness need to be selectively copied to modules when the module breakdown process is performed. Often the design changes made to a parent only relate to a few of the modules. The basic principle is, having made and stored a design change against a Module Parent Harness, that the design change can be applied to a number of modules that have been registered against the derivative. Access will be granted to a suitable form only if the current open harness is a module parent.

Two selection boxes will be provided, one for selecting which modules will have the design changes applied and the other for selecting which design changes to apply. The following logic will apply when building the selection lists. A browser on the form will display the list of modules that have design change records stored against them. The form will also contain three command buttons labeled:

Apply
Delete
Close

Selecting the Apply command button will create the Design Change record against the required module. Selecting the Delete command button will delete the selected Design Change record form the associated module. Selecting the Close command button will close the form.

Labor costing of modules can be run directly from the Module Parent Harness. A pre-requisite of this process is that the module breakdown procedure has been carried out for the Modular Parent Harness and engineering calculations have been performed on each module. The system will identify whether the items for processing are modular format. If the current open harness is a Modular Parent Harness, and the user requests labor costing calculations to be performed, the system will list all available modules within the Modular Parent Harness. The user will then be able to select the module or group of modules for which the labor costing is to be performed. Having identified that the item(s) under question are in modular format, the system will labor cost based on certain rules.

Certain components on a module are not to be included in the labor time calculation. The system will identify nodes on the module being costed that contain components that will not appear on the BoM for that module.

For all of the components identified, none of the following Labor Cost operations are to be carried out:
Fit Connector
Attach Component
Fit Cavity Plugs For all of the components identified, no labor time will be calculated for the specific type code of that component or for the specific part number of that component. If the type code of that component appears in a labor costing formula, the system will return 0 or False for that occurrence of the type code against that component.

Costing operations that refer to the total quantity of an item on a harness will refer to the quantity on the module child. When calculating the total quantity of an item on a harness for labor costing purposes, the system will return the total quantity of the item on that specific module. Costing operations that refer to the total quantity of an item through a location on a harness will refer to the quantity through that location on the Modular Parent Harness. The system will return the total quantity of the item through the location on the Modular Parent Harness, not the individual module being costed. The system will review the modules to which the item being calculated is associated. If all of the modules associated to the item through this location are incompatible with the module being costed, then that occurrence of the item will not be added to the total quantity.

Costing variables that refer to the total size of a branch at a location on a harness will refer to the size of the branch on the modular harness. When a variable refers to the total size of a branch on a harness for labor costing purposes, the system will return the total size of the branch as calculated on the Modular Parent Harness, not the individual module being costed. The system will review the modules associated to the items that make up the total branch size. If all of the modules associated to one of these items are incompatible with the module being costed, then the size of that item will not be added to the total size of the branch. Costing operations or variables that refer to the total quantity of insulation on a branch will refer to the manual quantity of insulation or system calculated quantity where no manual value is available. The quantity of insulation returned must be the quantity of insulation on that branch for the individual module being costed. The system will calculate the labor time associated to insulation for each branch on the module. If the insulation spans more than one branch, the system will calculate the time for each branch that it spans and then sum the result to create a total.

Module inclusion time is the additional labor time that is required when a module is included into a harness being manufactured. The system will allow the user to associate a specific time to each individual module within a harness.

This time relates to an additional time required if the module is to be included in the harness being manufactured. This module inclusion time will be included in the labor time report as a separate item and also in the total labor time calculated. The default module inclusion time is 0. If the harness being costed is not a module, the module inclusion time will not appear in the labor time report.

Different combinations of modules taken from a Modular Parent Harness are to be viewed in the graphical design system. The user will load the composite harness into for example the CAPITAL H™ Designer system. From the graphical design system the user will be able to select a single module from the Modular Parent Harness to be displayed or a combination of modules to be displayed. The system will only display items that are associated to the modules requested. All items not associated to the modules selected will be removed from the drawing. When necessary the user can request that the entire Modular Parent Harness be re-displayed. The user will be able to select whether the system should check if the requested modules are compatible. If this check has been selected, if two modules to be displayed are identified as incompatible, the system will report the incompatibility on screen and will not display the requested modules.

Figure 4:
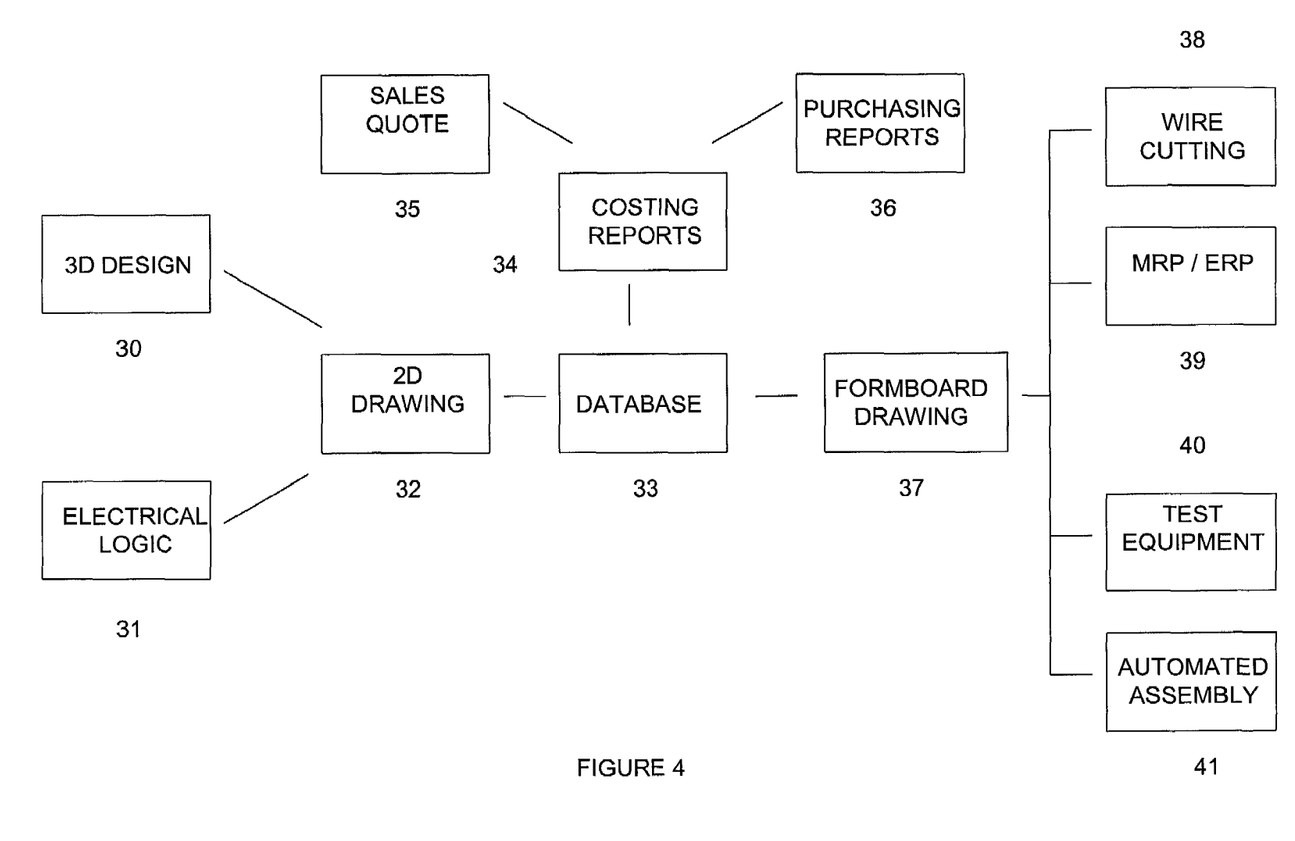
FIG. 4 shows one embodiment of a complete harness design, costing and manufacturing system in which the invention can be embodied.

FIG. 4 shows a complete system incorporating the invention. A 3D Design System 30 defines the spatial orientation of a wiring harness with regard to the structure of an automobile in which it is to be used. An Electrical Logic system 31 is used to define the electrical connections and components that are required. This information is combined to produce a 2D harness drawing at 32, and from this data about the harness and its components is passed to an Engineering Database 33. In this database system, there are kept details of components and wires required for specific modules that make up a complete Modular Parent Harness. Components and wires are assigned to the modules. The information stored in the database 33 is used to produce costing reports at 34, and these may include sales quotes at 35 and purchasing reports at 36. Data in the database 33 is also used to create a formboard drawing at 37, as well as information for wire cutting at 38, MRP/ERP at 39, test equipment routines at 40, and automated assembly information at 41. In accordance with the invention, the harness in the 2D drawing is broken down into modules, and components and wires are assigned to the modules automatically, the assignment details being stored in the database 33.

The invention has been described with reference to specific embodiments. It will be apparent to those skilled in the art that modifications may be made without departing from the spirit and scope of the invention as set forth in the appended claims.

What is claimed is:

1. A system for creating data relating to a modular wiring harness design, in which module data is created and stored for a plurality of harness modules representing wire and component element requirements for a plurality of options, the modules being capable of assembly in selected combinations to create a complete harness, wherein:

each element is assigned to be part of at least one module;

data representing at least some of the elements is associated with a plurality of modules;

an element which is associated with a plurality of modules that may be used together is assigned to be part of only a first module of that plurality of modules but has data representing that element associated with each of that plurality of modules, to thereby facilitate data processing or analysis relating to a second module of said plurality of modules, taking into account the presence of said element in a combination of said second module with said first module; and wherein data is stored representing a virtual parent harness including all modules available for designing a physical harness, and data is stored identifying that at least one of the modules is a core module, wherein a core module is an essential requirement for a physical harness.

2. A system as claimed in claim 1, wherein only one core module may be included in a physical harness.

3. A system as claimed in claim 1, wherein a wire in a complete harness is assigned exclusively to a module by a manual selection process.

4. A system as claimed in claim 1, wherein a wire in a complete harness is assigned exclusively to one module by an automatic process.

5. A system as claimed in claim 4, wherein components are assigned to modules by an automatic process.

6. A system as claimed in claim 1, wherein data is stored which indicates relationships between modules.

7. A system as claimed in claim 6, wherein data is stored which indicates whether a specified two modules are incompatible.

8. A system as claimed in claim 6, wherein data is stored which indicates that when a specified module is selected for a harness, at least one other predetermined module must also be selected for use in that harness.

9. A system as claimed in claim 6, wherein at least one of the modules is a core module and a complete harness must include one and only one core module.

10. A system as claimed in claim 9, wherein data is stored which indicates that when a specified module which is not a core module is selected for a harness, a core module must also be selected for use in that harness.

11. A system as claimed in claim 6, wherein a routine is provided for automatically checking the relationships between modules and for alerting a user in respect of invalid associations.

12. A system as claimed in claim 1, wherein data is provided which indicates wire and component element usage requirements for a harness comprising a plurality of modules, such usage requirements being determined taking into account the assignment of elements to modules so that an element which features in more than one of the modules is noted as being required only once.

13. A system as claimed in claim 1, wherein data relating to a harness design is analyzed, a plurality of modules are identified automatically, and data is stored identifying the modules.

14. A system as claimed in claim 13, wherein at least one module is identified manually.

15. A system as claimed in claim 13, wherein wire and component elements having data associated with a plurality of modules that may be used together are assigned automatically to one module only.

16. A system for creating data relating to a modular wiring harness design, in which the wiring harness design is analyzed and module data is created automatically and stored for a plurality of harness modules representing wire and component element requirements for those modules, the modules being capable of assembly in selected combinations to create a complete harness, wherein:

elements are assigned to modules;

data representing at least some of the elements is associated with a plurality of modules;

an element which is associated with a plurality of modules that may be used together is assigned to be part of only one of that plurality of modules but has data representing that element associated with each of that plurality of modules;

permissible relationships between modules are stored;

modules are selected for use in a harness, and a validation check is carried out automatically with reference to the stored permissible relationships between modules; and wire and component element requirements for the harness using the selected modules are calculated automatically having regard to the assignment of elements to modules, so that an element that is required for two modules that are to be used together will be noted as being required physically only once.

17. A system as claimed in claim 16, wherein data is created for the purpose of use in at least one of the following:

2D design drawings; costing reports; sales quotes; purchasing reports; formboard drawing production; wire cutting requirements; manufacturing resources planning; engineering resources planning; testing routines; and automatic assembly routines.

18. A system for creating data relating to a modular wiring harness design, in which module data is created and stored for a plurality of harness modules constituting a virtual parent harness, the modules representing wire and component element requirements for a plurality of options and being capable of assembly in selected combinations to create physical harnesses corresponding to selected combinations of options, wherein:

each element is assigned to at least one module of the parent harness;

data representing at least some of the elements is associated with a plurality of modules of the parent harness; and an element which is associated with a plurality of modules of the parent harness that may be used together in a physical harness is assigned to be part of only one of that plurality of modules but has data representing that element associated with each of that plurality of modules;

and wherein:

at least one of the modules is a core module which is necessarily present in a physical harness corresponding to the modular wiring harness design, said physical harness including no more than one core module.

19. A system as claimed in claim 18, wherein data is stored indicating whether two modules are incompatible with each other for use in a physical harness, and whether two modules must be used together if one of them is selected for use in a physical harness.

20. A system as claimed in claim 18, wherein the parent harness includes a plurality of core modules, and core modules are incompatible for use together in a physical harness.

21. A system as claimed in claim 18, wherein the parent harness is analyzed and if a wire or component is associated with a plurality of core modules it is assigned automatically to all of those core modules.

22. A system as claimed in claim 18, wherein the parent harness is analyzed and if a wire or component is associated with at least one core module and with at least one other module it is assigned automatically to the or each core module only.

23. A system as claimed in claim 18, wherein the parent harness is analyzed and if a wire or component is associated with a plurality of modules which are incompatible for use together in a physical harness it is assigned automatically to all of those modules.

24. A system as claimed in claim 18, wherein the parent harness is analyzed and if a wire or component is associated with a plurality of modules which are compatible for use together in a physical harness, it is assigned automatically to one only of those modules.

* * * * *